US009947304B1

(12) United States Patent
Begue

(10) Patent No.: US 9,947,304 B1
(45) Date of Patent: Apr. 17, 2018

(54) SPATIAL HARMONIC SYSTEM AND METHOD

(71) Applicant: Francis Begue, Harvard, MA (US)

(72) Inventor: Francis Begue, Harvard, MA (US)

( * ) Notice: Subject to any disclaimer, the term of this patent is extended or adjusted under 35 U.S.C. 154(b) by 0 days.

(21) Appl. No.: 15/590,552

(22) Filed: May 9, 2017

(51) Int. Cl.
*G10H 1/00* (2006.01)
*G06T 15/10* (2011.01)

(52) U.S. Cl.
CPC ........... *G10H 1/0008* (2013.01); *G06T 15/10* (2013.01); *G10H 2210/031* (2013.01); *G10H 2220/005* (2013.01); *G10H 2220/401* (2013.01)

(58) Field of Classification Search
CPC ........... G10H 1/0008; G10H 2210/031; G10H 2220/0045; G10H 2220/401
USPC ........................................................ 84/483.2
See application file for complete search history.

(56) References Cited

U.S. PATENT DOCUMENTS

| | | | | |
|---|---|---|---|---|
| 7,667,125 | B2 * | 2/2010 | Taub | G10H 1/00 84/616 |
| 7,956,273 | B2 | 6/2011 | Lemons | |
| 2007/0157795 | A1 * | 7/2007 | Hung | G10H 1/0008 84/600 |
| 2007/0180979 | A1 * | 8/2007 | Rosenberg | G02B 27/017 84/611 |
| 2008/0022842 | A1 * | 1/2008 | Lemons | G09B 15/009 84/483.2 |
| 2008/0115656 | A1 * | 5/2008 | Sumita | G10G 3/04 84/612 |
| 2008/0190271 | A1 * | 8/2008 | Taub | G10H 1/0058 84/645 |
| 2008/0245212 | A1 * | 10/2008 | Lemons | G09B 15/02 84/483.2 |
| 2008/0264239 | A1 * | 10/2008 | Lemons | G10L 17/26 84/477 R |
| 2008/0271589 | A1 * | 11/2008 | Lemons | G10L 21/06 84/477 R |
| 2008/0271590 | A1 * | 11/2008 | Lemons | G09B 21/009 84/483.2 |
| 2008/0271591 | A1 * | 11/2008 | Lemons | G09B 15/023 84/601 |
| 2008/0276790 | A1 * | 11/2008 | Lemons | G09B 15/023 84/477 R |
| 2008/0276791 | A1 * | 11/2008 | Lemons | G10H 1/0008 84/483.2 |

(Continued)

*Primary Examiner* — David Warren
(74) *Attorney, Agent, or Firm* — Vincent G. LoTempio; David T. Stephenson; Kloss, Stenger & LoTempio

(57) ABSTRACT

The present disclosure provides a system and method for representing music in a three dimensions using contexts based around tonal centers, to form three dimensional geometric shapes. The musical notation method described herein is easy to understand and visualize. The method is based on three dimensional structures which may represent contexts. The contexts may be formed by combining diminished and augmented scales shown as symmetrical three dimensional geometric shapes. These symmetrical geometric shapes may be formed from a plurality of polygons, which may include polygons comprised of a set of related notes from a diminished or augmented scale, together forming a looped harmonic polygon. Each note in a respective scale is placed at a vertex of a harmonic polygon, wherein the vertices of the harmonic polygons are selected from notes in a twelve note chromatic scale.

20 Claims, 21 Drawing Sheets

(56) References Cited

U.S. PATENT DOCUMENTS

| | | | | |
|---|---|---|---|---|
| 2008/0276793 | A1* | 11/2008 | Yamashita | G10H 1/0091 84/611 |
| 2008/0314228 | A1* | 12/2008 | Dreyfuss | G09B 15/00 84/477 R |
| 2009/0223348 | A1* | 9/2009 | Lemons | G10H 1/0008 84/483.2 |
| 2015/0221231 | A1 | 8/2015 | Ua-Aphithorn | |
| 2015/0356958 | A1 | 12/2015 | Brenna | |

* cited by examiner

SPATIAL HARMONIC SYSTEM AND METHOD

FIELD

This invention relates to music and music analysis.

BACKGROUND

Music theory has traditionally been studied by analyzing relationships between major and minor tonalities based on a tonal center, or a "root" note. In a traditional harmonic system of understanding music, a composer understands the relationship between major, minor and dominant chords and uses this framework as a way to create music that makes sense to the composer and listener. Music, however, often finds a way to transcend traditional theoretical boundaries while still appealing to a listener. Even earlier Western music, written by composers like J. S. Bach of the Baroque period, at times crossed the boundaries of traditional music theory and used non-harmonic tones, while still producing meaningful melodies and harmonies.

More recently, music such as jazz and postmodern styles incorporate tonal intervals and chord changes in ways that defy traditional rules, yet still make musical sense. While non-traditional tonalities have harmonic relationships that may innately connect with a listener, an effective method for representing these non-traditional relationships in a way that a student of music can easily understand and visualize has not yet been developed.

Conventional sheet music notation, which includes notes on a musical staff written on a two dimensional sheet or display, does not provide a student or composer with the best means for understanding of the harmonic relationships between notes. Three dimensional representations of music can augment a musician's understanding of music theory. Human beings are designed to most effectively see the world in three dimensions. In terms of comprehension and creation, seeing is more effective than reading.

A system of representing music in three dimensions would allow a listener to not only 'see' music, but also provide a framework where musical notes can belong to specific spatial key centers. A key center, expressed in 3D, could provide a means for effective analysis and richer composition.

Prior attempts to represent musical harmony in three dimensions have not been widely adopted in music teaching and analysis. These attempts have fallen short in terms of providing coherent systems useful for the purpose of music analysis. Dmitri Tymoczko's The Geometry of Musical Chords, the Riemannian Tonnetz, Tod Machover's HyperScore and other methods of representing music in three dimensions have only provided ways to represent music in either subjective ways, which impose criteria that do not relate to music or harmony and use mathematical equivalences which ignore harmonic functionality, or by following counterpoint considerations that relate to idiomatic style rather than to functional harmony. Therefore, there is a need for different systems and methods of musical notation that allow music to be visualized three dimensionally in new ways.

SUMMARY

The present disclosure provides a system and method for representing music in three dimension using contexts based around tonal centers, to form three dimensional geometric shapes. The musical notation system and method described herein are easy to understand and visualize. The notation system and method is based on three dimensional structures which may represent contexts. The contexts may be formed by combining diminished and augmented scales shown as symmetrical three dimensional geometric shapes. These symmetrical geometric shapes are formed from a plurality of polygons, wherein each polygon may be comprised of a set of related notes from a diminished or augmented scale, together forming a looped harmonic polygon. In the system and method of the present disclosure, each note, which may be represented, or labeled, as a letter or other symbol for musical notation, in a respective scale is placed at a vertex of a harmonic polygon, wherein the vertices of the harmonic polygons are selected from notes in a twelve note chromatic scale.

The shapes of the harmonic polygons of the present disclosure may include squares, triangles and rectangles. Harmonic squares are formed by placing four consecutive notes of a diminished scale at the vertices of the square, wherein each note is a minor third apart from the adjacent note in the square. In this manner, a diminished scale loop in the shape of a square is formed, such that progressing through the four notes at the vertices of the square in minor third intervals leads back to the original note. The square thereby forms a diminished scale comprised of four notes, hereinafter referred to as a diminished square.

In the present disclosure, harmonic triangles are formed by placing notes at the vertices of a triangle, wherein each note is a major third apart from adjacent notes. In this manner, a triangular loop is formed, such that proceeding through the three notes placed at the vertices of the harmonic triangle leads back to the original note. The triangle thereby forms an augmented scale comprised of three notes, hereinafter referred to as an augmented triangle. The augmented triangle may be equilateral, thereby representing the equal harmonic distance between each note. The sides of the triangle may, in some embodiments, be longer than the sides of the square, thereby representing in scale the greater harmonic distance between the notes of a major third interval when compared to the lesser distance between the notes of a minor third interval. The width of the spaces may be fixed, graphically representing the distance between the notes.

In the process of the present disclosure, diminished squares may be linked with augmented triangles through a common note at a shared vertex of the triangle and of the square. By placing an augmented triangle at the corners of the diminished square using a common note, such that the sides of the augmented triangle adjacent the sides of the diminished square form right angles, a symmetrical two dimensional geometric structure is formed by the diminished square and four augmented triangles at the each corner of the square. By drawing lines between the outer vertices of the augmented triangle an octagon is formed on the perimeter of the geometric structure. Inside the octagon are harmonic polygons, which may include squares, triangles and rectangles. Together, the combined harmonic polygons form a context around the diminished square.

One property of a context is its ability to "shift" to create adjacent contexts in a different key. A context may contain each note in the twelve note system, and each note is capable of forming a basis for a context. Different contexts create different tonalities and may traverse twelve keys through a cycle of fifths. Contexts may be organized in a three dimensional space, thus creating a dynamic system and method that spells chords pointing to different contexts.

A three dimensional harmonic structure may be formed by combining diminished squares and augmented triangles, such that each diminished square and augmented triangle in the structure are linked through shared notes at their vertices. Identification of key centers and harmonic relationships based on the key centers allows the three dimensional harmonic structure to be labeled as a context based on these key centers. In some embodiments of the present disclosure, multiple contexts may incorporated into a three dimensional structure, such as a rhombicuboctahedron, when the structure is formed from different diminished squares and augmented triangles.

Three dimensional contexts can be represented on a display of a computing device using a method of the present disclosure. In this embodiment, a user may navigate through the three dimensional structure, where notes in a melodic progression are highlighted in a three dimensional context as they are put in to the computing device. Adjacent contexts may appear when notes shared between the contexts are put in and a key center is shifted.

DETAILED DESCRIPTION

Figure 1A:
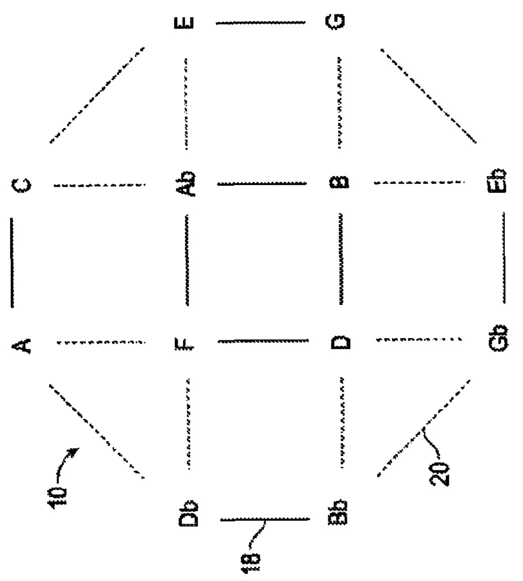
FIG. 1A shows a two dimensional representation of twelve tones in a C/Gb context centered on a diminished scale.
Figure 1C:
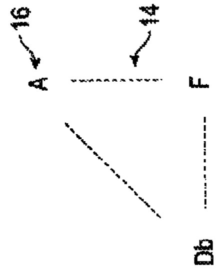
FIG. 1C shows a two dimensional representation of a three tone augmented scale in the form of a triangle.
Figure 1B:
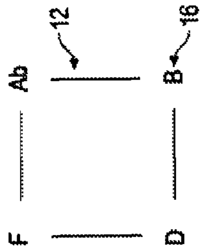
FIG. 1B shows a two dimensional representation of a four tone diminished scale in the form of a square.

FIGS. 1A-C show harmonic polygons of the present disclosure. FIG. 1A illustrates a diminished context 10 in two dimensions, where diminished context 10 is comprised of linked harmonic polygons. The shapes of the harmonic polygons of the present disclosure may include squares, triangles and rectangles. Each harmonic polygon is comprised of a set of related notes from a diminished or augmented scale. In the system and method of the present disclosure, each note in a harmonic polygon is placed at a vertex 16 of a harmonic polygon, wherein the vertices 16 of the harmonic polygons are selected from a set of notes in a twelve note chromatic scale. The harmonic polygons that comprise diminished context 10 are shown in FIGS. 1B and 1C.

FIG. 1B shows a diminished square 12, which represents a diminished scale of four consecutive notes an interval of a minor third apart. FIG. 1B shows a diminished square 12 built upon the notes of D, F, Ab and B. Diminished squares 12 may be formed by placing four consecutive notes of a diminished scale at the vertices 16 of diminished square 12, wherein each note is a minor third from the adjacent note in diminished square 12. In this manner, a diminished scale loop in the shape of a square is formed, such that progressing through the four notes at the vertices 16 of diminished square 12 in minor thirds leads back to the original note.

FIG. 1C shows an augmented triangle 14, which represents an augmented scale of three consecutive notes an interval of a major third apart. FIG. 1C shows an augmented triangle 14 build upon the notes of Db, A and F. FIG. 1C shows augmented triangle 14 having notes at the vertices 16 of the augmented triangle 14, wherein each note is a major third from adjacent notes in the triangle. In this manner, a triangular loop is formed, such that progressing through the three notes placed at the vertices 16 of augmented triangle 14 leads back to the original note. Augmented triangle 14 thereby forms an augmented scale comprised of three notes.

FIG. 1A shows the lines of the augmented triangle 14 forming right angles with adjacent lines of diminished square 12. FIG. 1A illustrates the process of combining a diminished square 12 with augmented triangles 14 to form a context. A common note between a diminished square 12 and an augmented triangle 14 may be used to join a diminished square an augmented triangle 14. For example, the F in diminished square 12 of FIG. 1B is also included in the augmented triangle 14 of FIG. 1C. This F allows augmented triangle 14 to be placed at the vertex 16 of diminished square 12, as shown in the upper left portion of FIG. 1A.

Once augmented triangles 14 have been added at each vertex 16 of diminished square 12, solid lines for minor third intervals 18 may be drawn on the perimeter of diminished context 10 to complete the geometric figure that forms diminished context 10. By drawing lines from the outer vertices 16 of augmented triangles 14 to the nearest adjacent vertices 16 of other augmented triangles 14 an octagon is formed on the perimeter of the geometric structure. Within this octagon are harmonic polygons, including squares, triangles and rectangles. Together these shapes form a diminished context 10 around diminished square 12.

FIG. 1A shows a diminished context 10 centered on a four tone diminished square 12 comprised of the notes Ab, B, D, and F. FIG. 1A shows how this Ab diminished scale relates to four three tone augmented scales, where the first augmented triangle is formed by the notes A, F, Db, the second is formed by the notes Bb, D, Gb, the third is formed by the notes B, G, Eb, and the fourth augmented triangle is formed by the notes C, Ab, E. Major third intervals 20, which comprise augmented triangles 14, are illustrated as dashed lines, while minor third intervals 18, which comprise diminished square 12, are shown as solid lines. As a convention, and for visual clarity purposes, note alterations in this document are 'flat,' disregarding conventional harmonic spelling.

Diminished context 10 may be referred to by the notes at the lower left vertex and the upper right vertex of the octagon. In FIG. 1A, these notes are represented by Gb and C, which are separated by an interval of a flat fifth. The key centers of a context form major scales in thirds by following a pattern through the context, shown highlighted in FIG. 2. The present disclosure is not limited to the use of any particular type of scale, such as a major scale, as a key center, and harmonic and melodic scales are contemplated as within the scope of the present disclosure.

Figure 2:
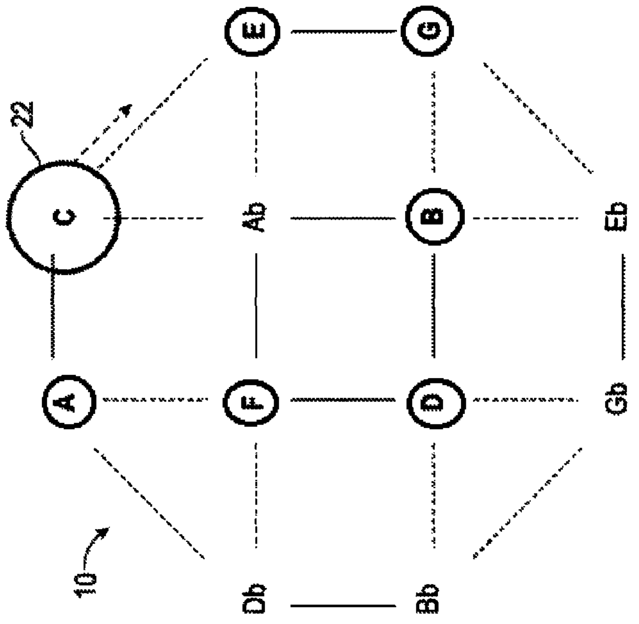
FIG. 2 shows a two dimensional representation of a C/Gb context highlighting a C major scale.

FIG. 2 shows a diminished context 10 where a C major scale may be spelled in thirds: C, E, G, B, D, F, A. The tonal center 22 C is located at the upper right vertex of the octagon of diminished context 10 and is highlighted with a large circle. An arrow points in the direction of the formation of a C major scale, formed in intervals of thirds. Each note in the C major scale is highlighted with a smaller circle.

Figure 3:
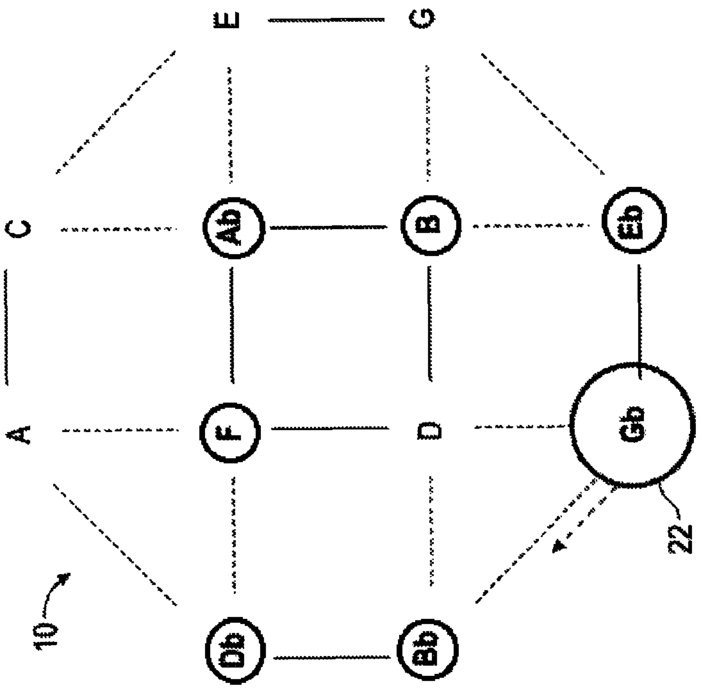
FIG. 3 shows a two dimensional representation of a C/Gb context highlighting a Gb major scale.

FIG. 3 shows diminished context 10 described in FIG. 1 and shows a Gb major scale spelled in thirds: Gb, Bb, Db, F, Ab, B, Eb. The tonal center 22, here a Gb, is located at the lower left vertex of the octagon of diminished context 10 and is highlighted with a circle. An arrow points in the direction of the formation of a Gb major scale, formed in intervals of thirds. As in FIG. 2, the notes of the Gb major scale are highlighted with circles.

The C major scale of FIG. 2 and the Gb major scale of FIG. 3 provide two tonal centers 22, a diminished fifth apart. Thus, the diminished context 10 of FIG. 1 is referred to herein as a C/Gb diminished context 10.

Figure 4:
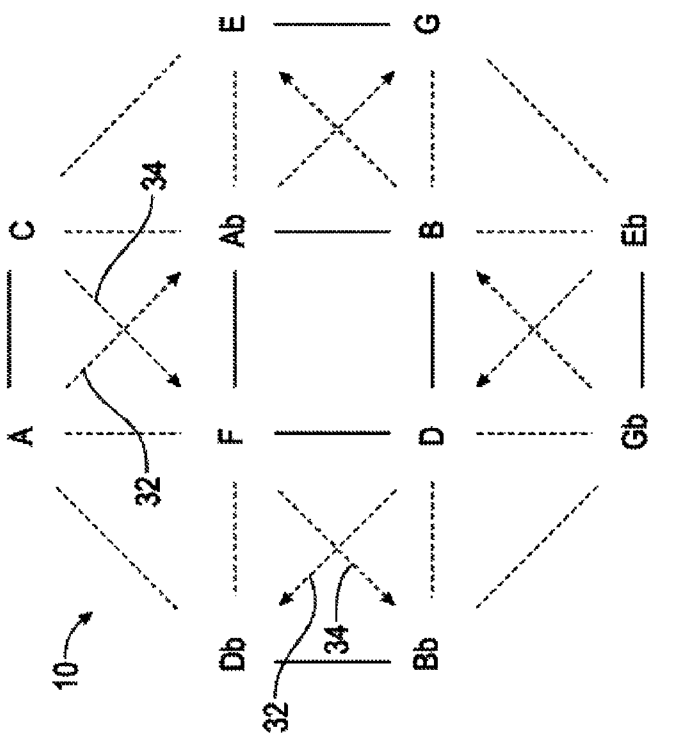
FIG. 4 shows the inner intervallic dynamics of the C/Gb context in two dimensions.

FIG. 4 shows the inner intervallic dynamics of the C/Gb context. Flat 9 intervals 32 are found from A to Ab and from Ab to G, as well as from Eb to D, and from D to Db. Fifth intervals 34 are found from C to F and from F to Bb, as well as from Gb to B, and B to E. The top to bottom relationships are concentric and that the left to right relationships are eccentric.

Figure 5:
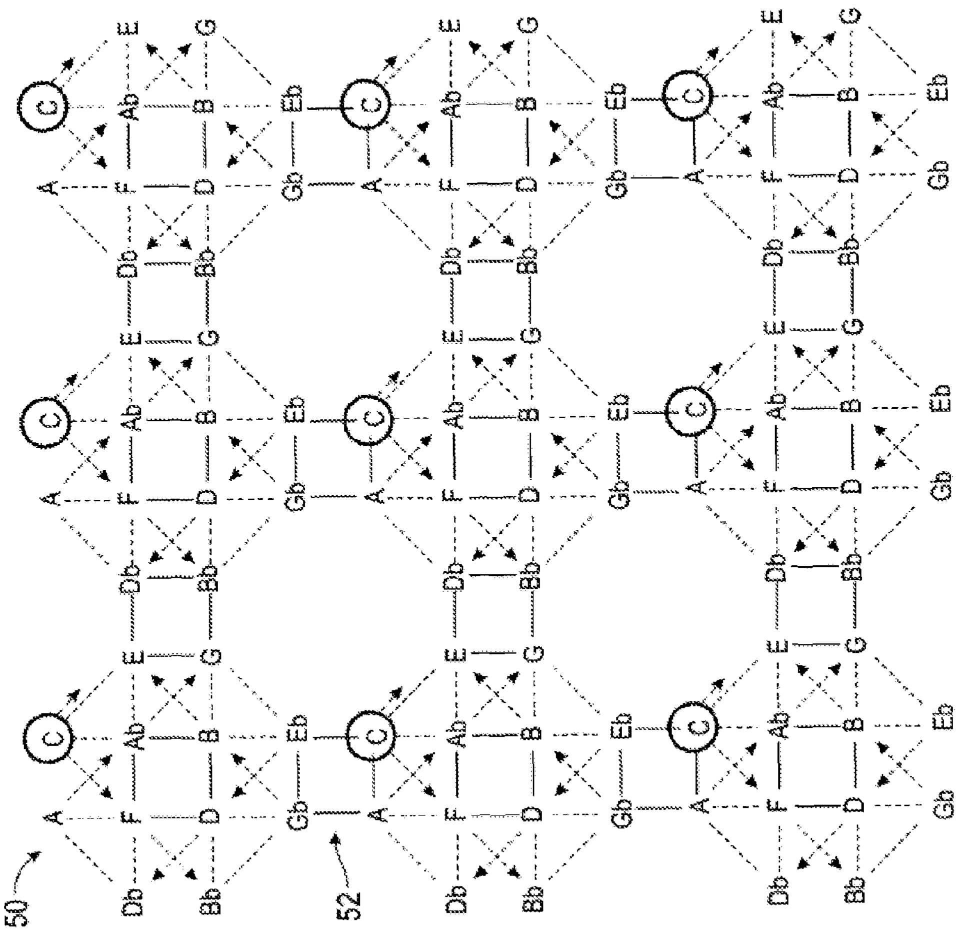
FIG. 5 shows a C/Gb context propagated in a plane in two dimensions.

FIG. 5 shows how one diminished context 10 may propagate in a plane to form a propagated context 50. The occurrence of minor third intervals 18 on the outer edge of the C/Gb diminished context 10 provides a context linking region 52. Diminished scales may be completed and the plane may be populated in a uniform manner to form new diminished squares 12 and create a logical connection to new contexts 10.

Figure 6:
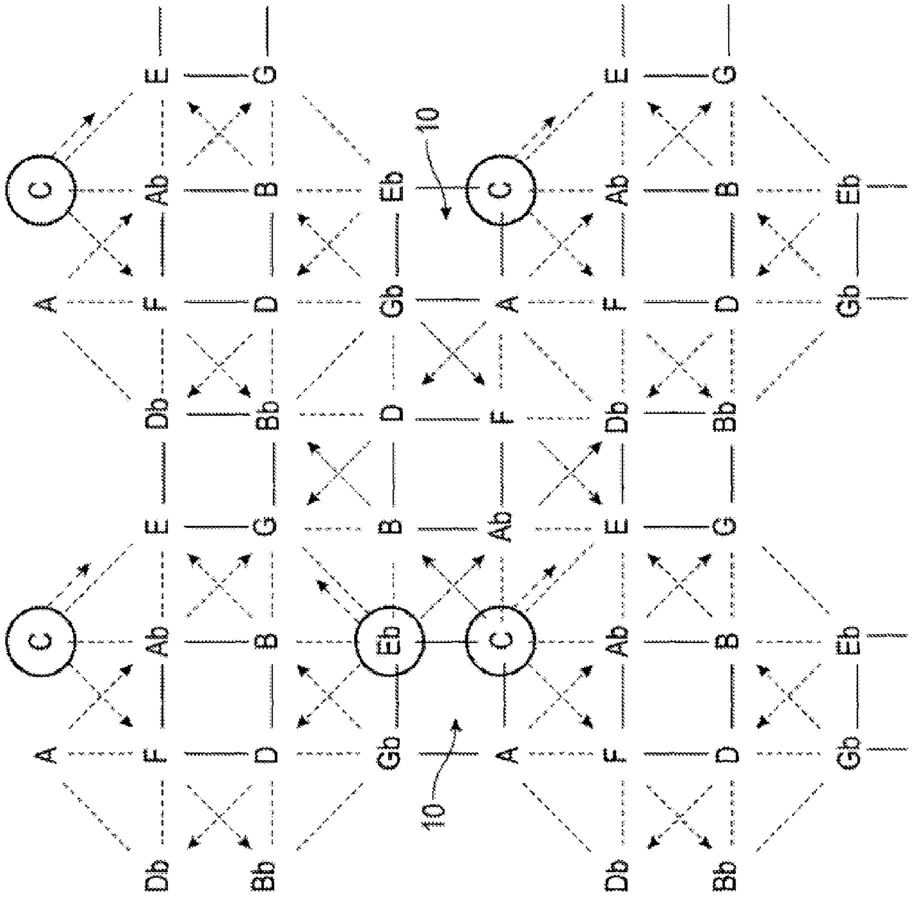
FIG. 6 shows a C/Gb context and Eb/A context in a plane in two dimensions.

FIG. 6 shows the formation of a second context from the propagated two contexts 50 of FIG. 5. A property of contexts is that they can be 'shifted' to create adjacent contexts.

In FIG. 6, Eb and C are shown being the tonal centers 22. An Eb tonal center is circled with an arrow pointing in the direction of the Eb major scale formed in third intervals. The Eb major scale, in third intervals, comprises the notes Eb, G, Bb, D, F, Ab, and C. FIG. 6 shows how a Eb/A diminished context 10 occurs naturally on the same plane as the C/Gb diminished context 10. The intervallic relationships of a major third are respected when duplicating the notes B, D, F and Ab. The new Eb/A context displays opposite inner dynamics: with top/bottom being eccentric and left/right being concentric, however, the intervallic structure remains the same with respect to the tonal center notes, Eb and A, of the new context. The C/Gb and Eb/A contexts 10 share the notes on their outer edges, and this note sharing plays an important role in the system and method. The plane's tonal centers 22: C, Eb, Gb, and A naturally share the same diminished scale, which is consistent with traditional harmony.

Figure 7:
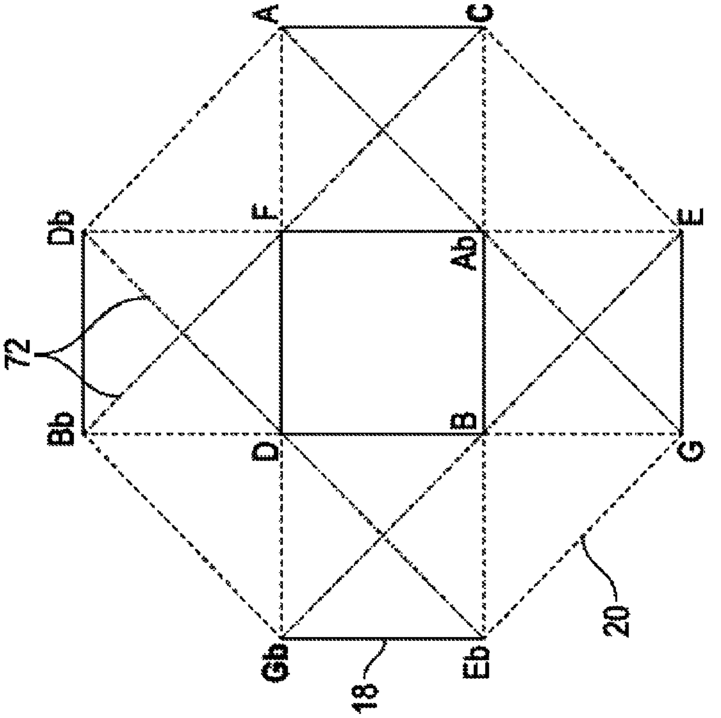
FIG. 7 shows an orthogonal projection of a C/Gb context in two dimensions.

FIG. 7 shows the orthogonal projection of a diminished context 10 in C/Gb. Major third intervals 20 are represented with dashed lines. Minor third intervals 18 are represented with solid lines. Inner dynamic intervals 72, which include fifth intervals and flat ninth intervals, are represented by dash-dot-dash lines.

Figure 8:
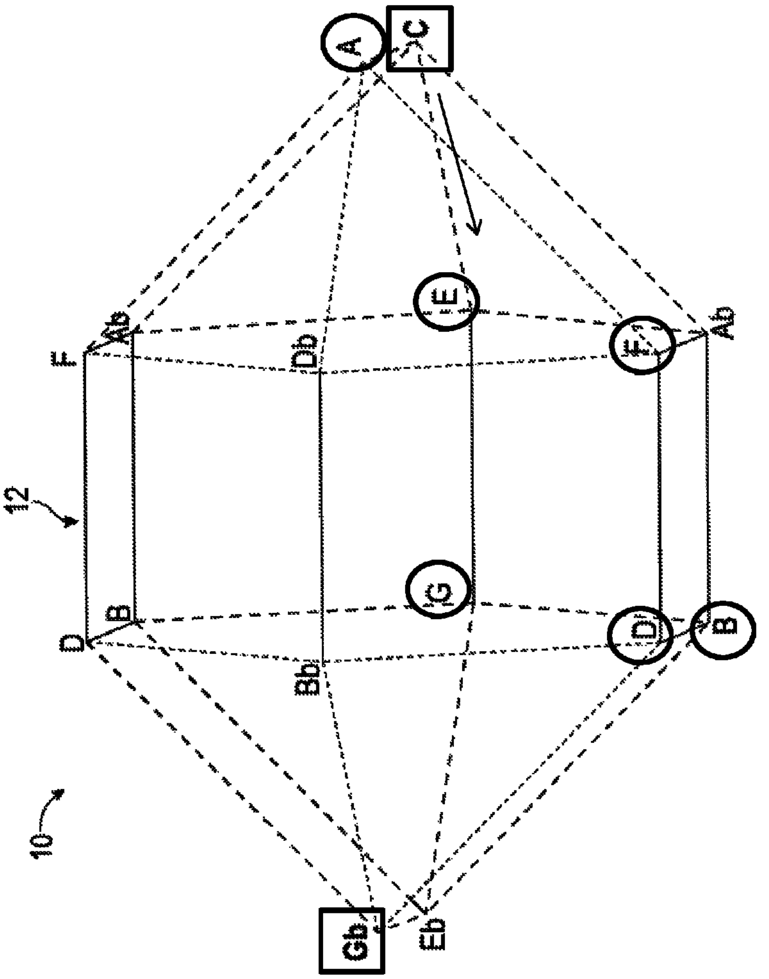
FIG. 8 shows a three dimensional representation of a C/Gb context.

FIG. 8 shows a three dimensional representation of a C/Gb diminished context 10. The context here forms a single geometric shape that may comprise a unit. Each note is connected to four other vertices and at least three other notes. In the present disclosure, a diminished context 10 is formed by combining harmonic polygons such that all vertices 16 of each polygon are connected by at least two major thirds and at least one minor third. In one embodiment, a diminished context 10 is created by introducing identical first and second diminished squares 12, shown in FIG. 8 as being comprised of the notes B, D, F, and Ab. The first and second diminished squares 12 are displaced along a y-axis. Eight augmented triangles 14 are connected to the diminished squares 12, each having a common note with a vertex 16 of the diminished squares 12. An octagon is formed when lines are drawn between the augmented triangles 14.

Figure 12A:
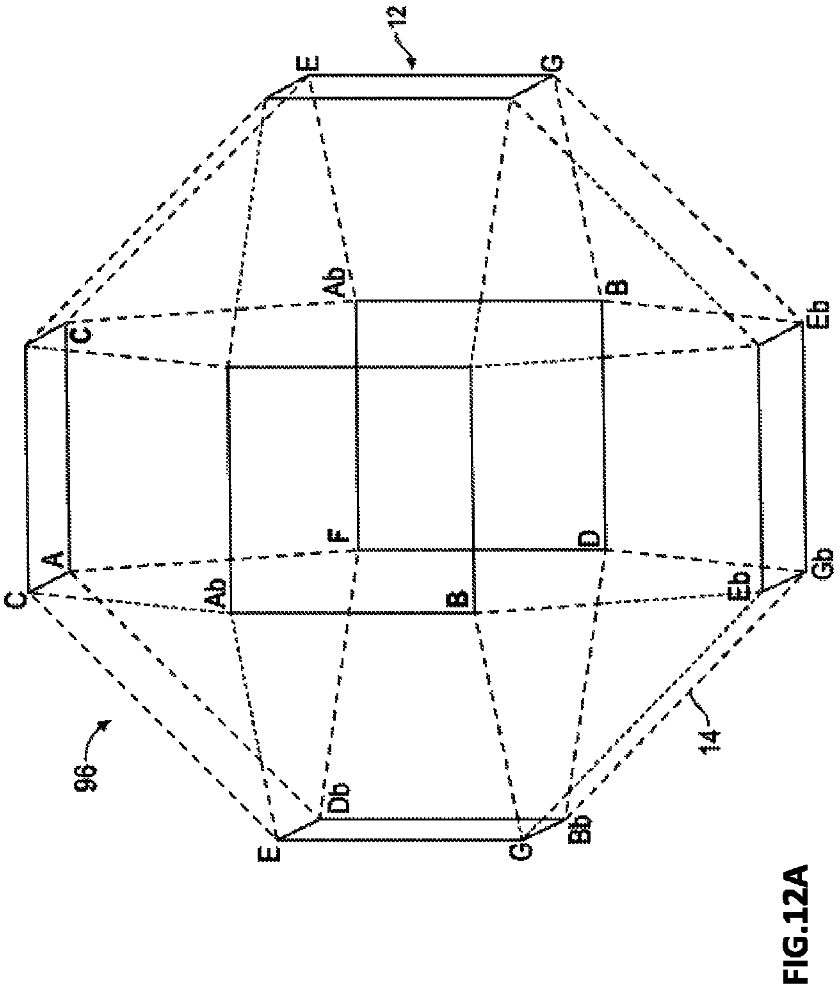
FIG. 12A shows intervallic relationships according to the present disclosure within a rhombicuboctahedron 96

In alternative embodiments, different geometric structures containing contexts 10 may be formed, such as a rhombicuboctahedron (shown in FIG. 12A). In a three dimensional representation of the contexts 10 of the present disclosure, there may be at least three types of polygons to form sides, including a square, a triangle and a rectangle.

Figure 9:
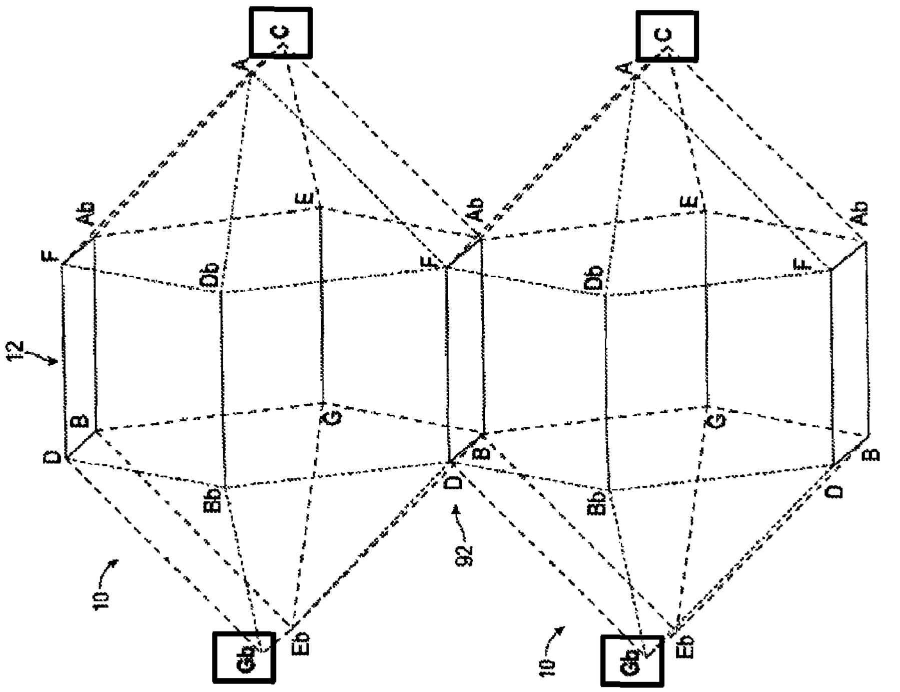
FIG. 9 shows a three dimensional representation of a C/Gb context propagated vertically.

FIG. 9 shows how the diminished context 10 of FIG. 8 (C/Gb) may be propagated vertically, where contexts may be considered identical geometric shapes comprising units that are linked such that the units form segments in a chain, wherein the chain may take various shapes based upon which face of the units link to form segments. Units, or contexts 10, may be linked when there is a shared set of notes in a face of the geometric structure. The two contexts 10 in FIG. 9, for example, have identical diminished squares 12. Therefore, the second, identical, diminished context 10 can be vertically linked by a single diminished square 12. The central diminished square 12 in the structure becomes a linking diminished square 92. Vertical propagation of diminished context 10 maintains a logical intervallic structure.

Figure 10:
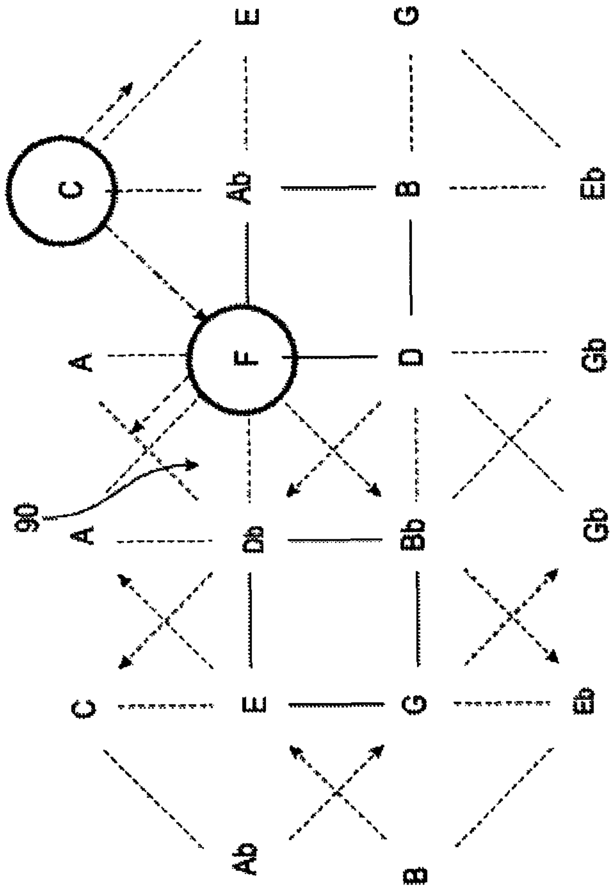
FIG. 10 shows a C/Gb context sharing notes with a new context on one of its rectangular faces, thereby generating an F/B context.

FIG. 10 shows in two dimensions how a C/Gb diminished context 10 can share the notes on one of its rectangular faces 90, where the longer sides of the rectangle represent a major third interval 20 and shorter sides represent a minor third interval 18. Sharing notes in this way generates a new context F/B, a fifth apart from the C/Gb context.

Figure 11:
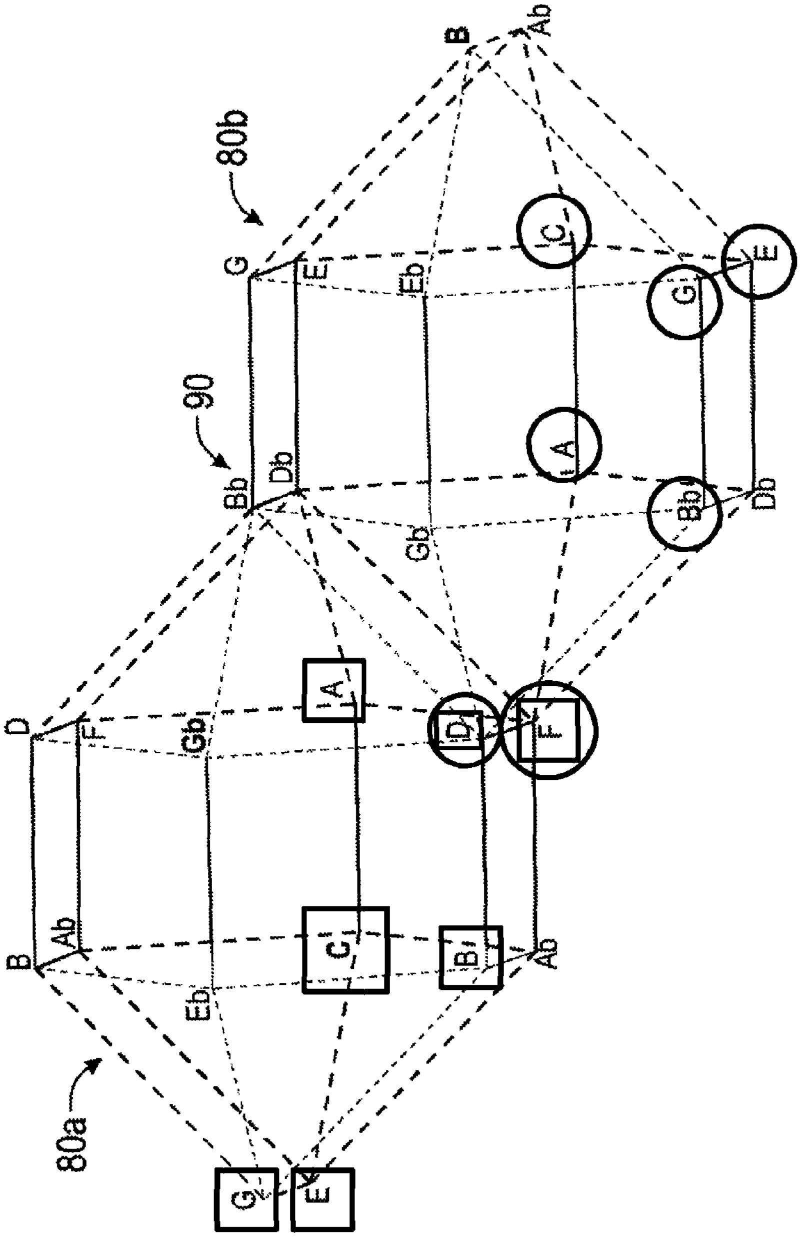
FIG. 11 shows a three dimensional representation of linked contexts where a C/Gb context is linked to an F/B context.

FIG. 11 shows a C/Gb linked context 80*a* sharing a rectangular face 90, including the face edges shown as lines, with an F/B linked context 80*b*. Linked contexts 80*a* and

80*b* have a relationship a fifth apart, where C has a fifth relationship with F and Gb has a fifth relationship with B. Thus, a new plane is created, formed by the octagon of the F/B linked context 80*b* and coplanar with the Ab diminished square of C/Gb linked context 80*a*. Continuing in this respect, a new linked context Ab/D could share a new plane with the F/B context and with the F/B context diminished scale comprised of the notes Bb, G, E, Db.

Linked F/B context 80*b*, as shown in FIG. 11, allows a musician to visualize a second context in relation to first context for the purpose of establishing of a new tonal center 22 or utilizing notes outside of a key. For example, FIG. 11 shows the relationship between a C major scale (shown highlighted in squares) in linked context 80*a* and an F major scale (shown highlighted in circles) in linked context 80*b*. The F note is shared on a rectangular face 90 between the C major scale and the F major scale of the two linked contexts 80*a* and 80*b*. If a musician seeks to establish a tonal center 22 of F major, rather than C major, the musician can clearly visualize the relationship between C and F scales in the spatial harmonic system and method of the present disclosure.

A tonal center 22 of C of the C/Gb linked context 80*a* may be established by playing notes in a C major scale, the notes of which are highlighted in squares in linked context 80*a*. An F major scale, the notes of which are highlighted in circles in linked context 80*b*, shows that in transitioning from the key of C to the key F a Bb note would be played, where Bb is outside of the C major scale. The Bb of the F/B linked context 80*b* would likely be played in order to establish a new tonal center 22 of F in linked context 80*b*. Identification of tonal centers 22 and the linked contexts 80*a* and 80*b* is useful for visualizing the relationship between the key of C and the key of F. In the present disclosure, each context may generate a plane with four potential tonal centers 22 (see FIG. 6).

FIG. 12A shows intervallic relationships according to the present disclosure within a rhombicuboctahedron 96. The rhombicuboctahedron 96 has six diminished squares 12, and eight augmented triangles 14. Altogether, the rhombicuboctahedron 96 has 26 faces.

Figure 12B:
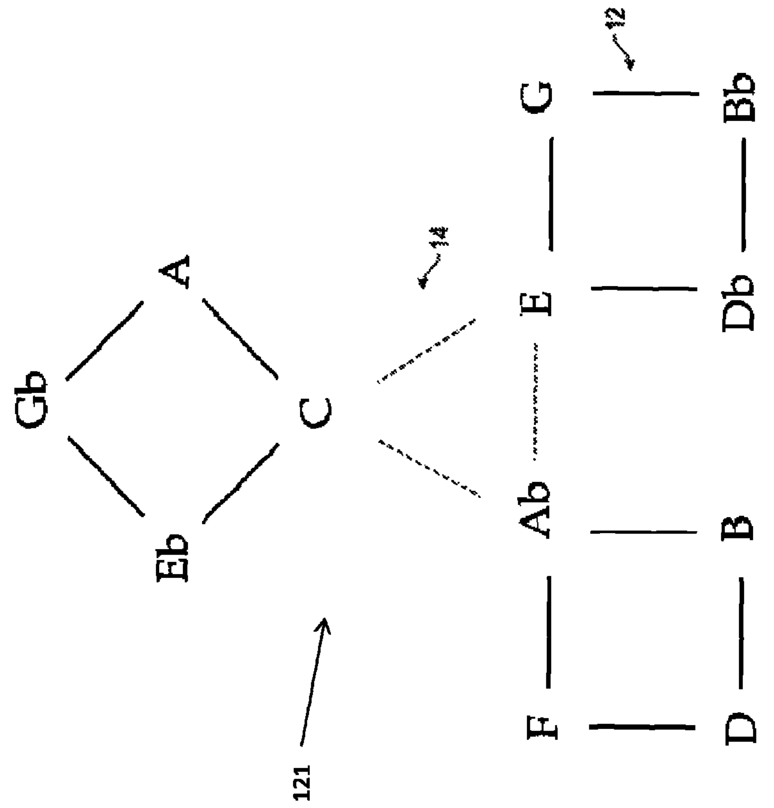
FIG. 12B shows triangle centered context in two dimensions.

FIG. 12B illustrates a triangle centered context, or augmented context 121, in two dimensions. Augmented context 121 suggests augmented harmony as a whole tone scale is spelled: C, D, E, Gb, Ab, Bb. (as shown in FIG. 12C).

Figure 12C:
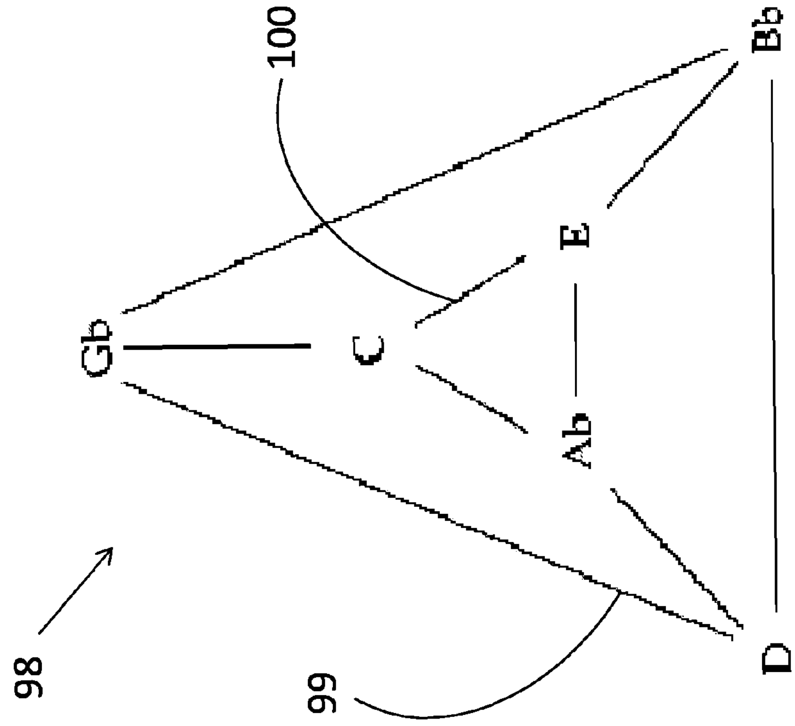
FIG. 12C shows a whole tone scale in three dimensions formed from two augmented triangles.

FIG. 12C illustrates a whole tone scale based on augmented triangles 98 formed in three dimensions. The whole tone scale based on augmented triangles 98 is comprised of two adjacent augmented triangles 14 positioned in the same orientation in three dimensions, but separated along a z-axis. In the whole tone scale based on augmented triangles 98, each vertex 16 on a first augmented triangle 99 is connected to a corresponding vertex 16 on a second augmented triangle 100 by a line representing a diminished fifth relationship, or tritone. For example, a Gb on a first augmented triangle 99 of a whole tone scale based on augmented triangles 98 is connected by a line to a C on a second augmented triangle 100 of the whole tone scale based on augmented triangles 98. The whole tone scale based on augmented triangles 98 illustrates augmented harmony as a whole tone scale, which in FIG. 12B, is spelled: C, D, E, Gb, Ab, Bb.

In an embodiment of the present disclosure, a whole tone scale based on augmented triangles 98, as shown in FIG. 12C, can be drawn within a rhombicuboctahedron to illustrate whole tone scales and the intervallic relationships between the rhombicuboctahedron and the whole tone scale based on augmented triangles 98.

Figure 13A:
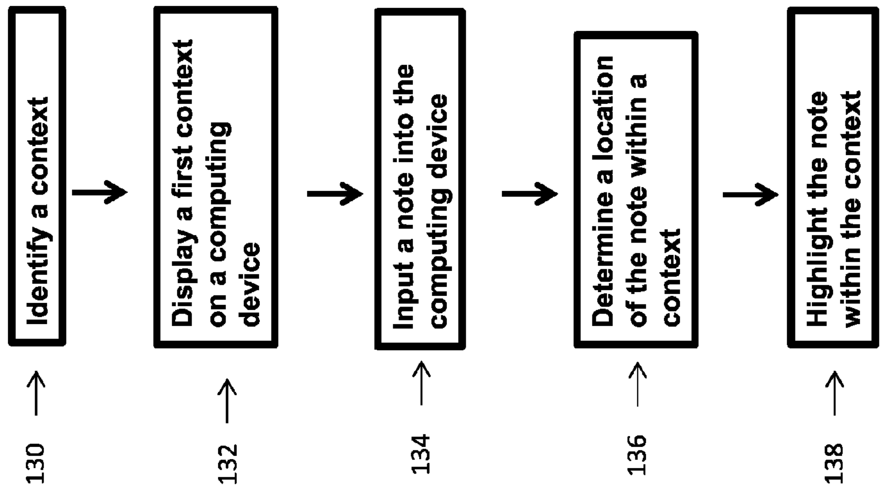
FIG. 13A is a flow diagram showing the steps in navigation within a context using a computing device.
Figure 13B:
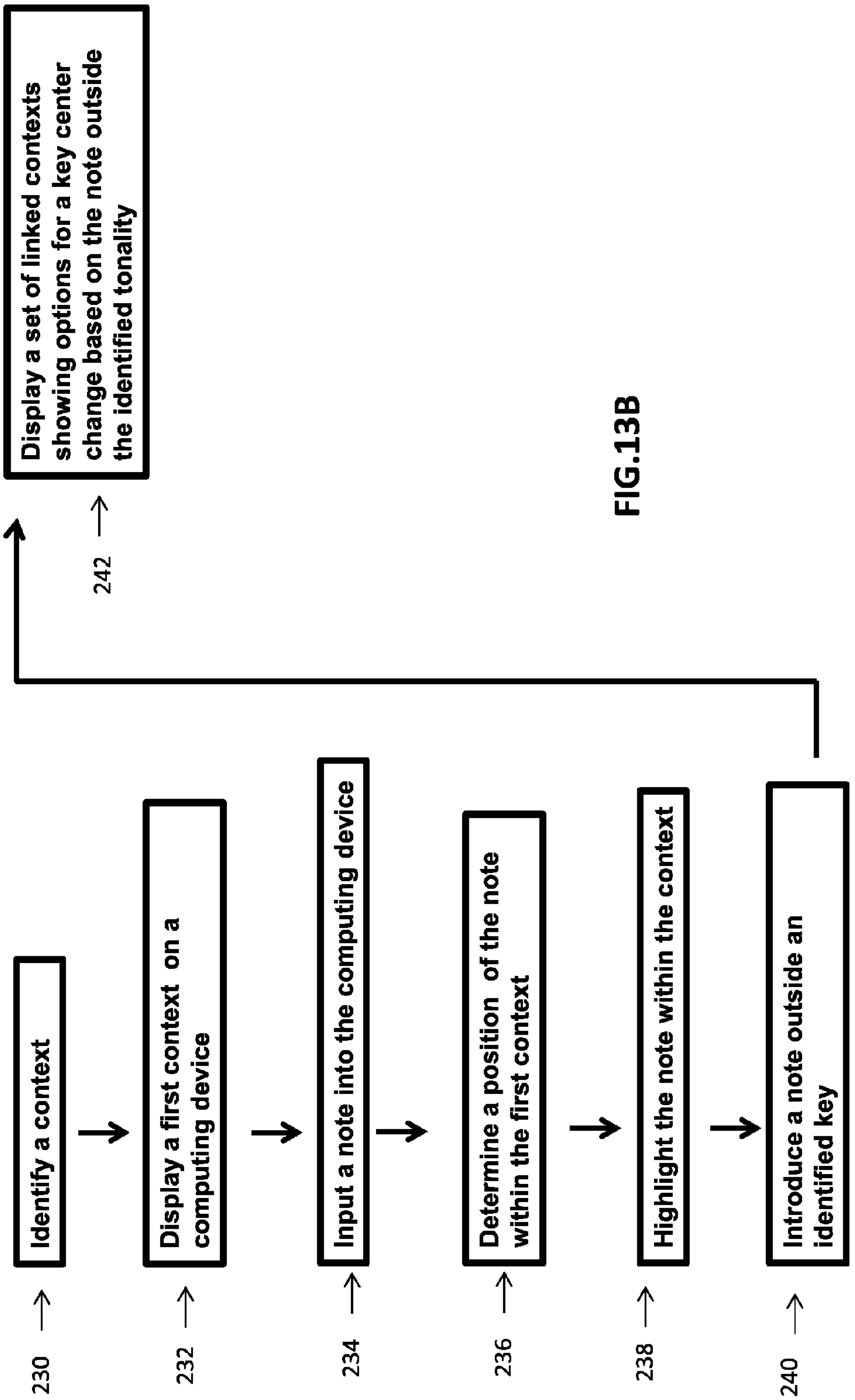
FIG. 13B is a flow diagram showing navigation through multiple contexts in a computing device.
Figure 13C:
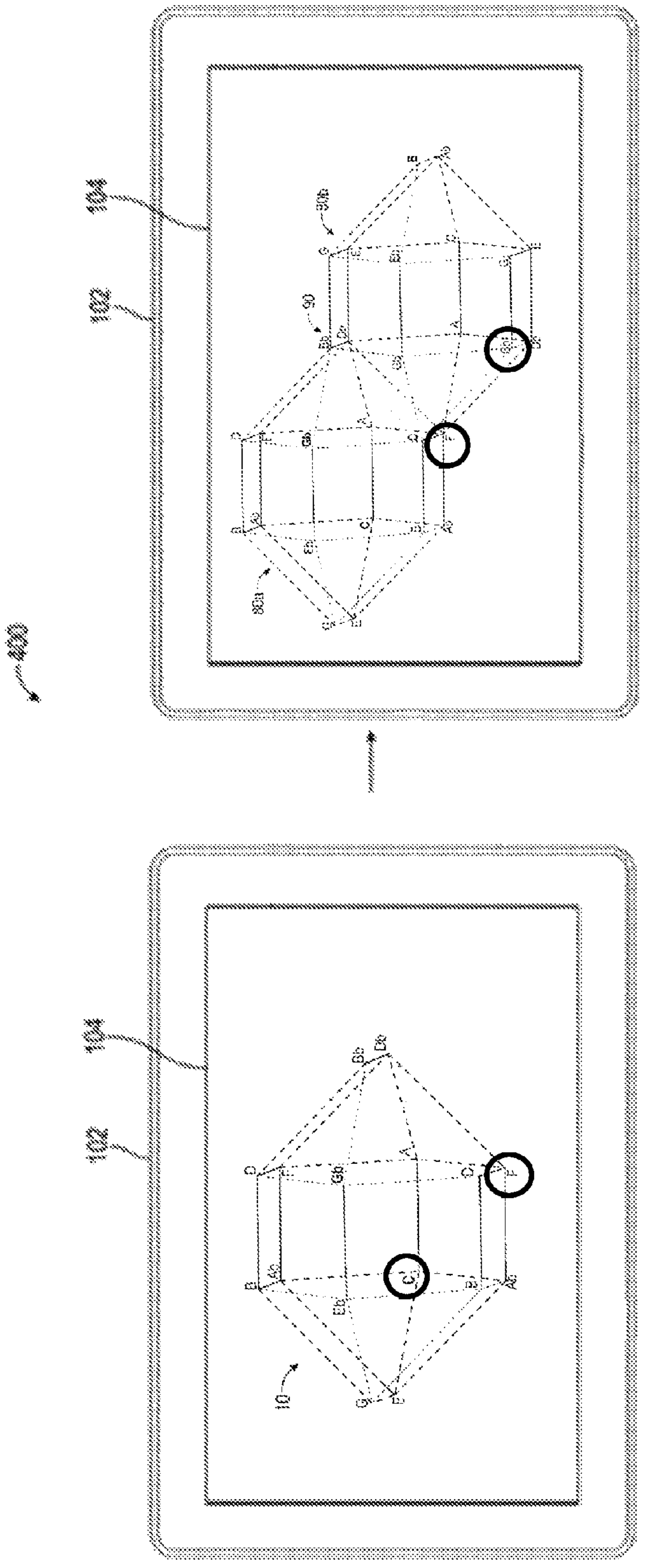
FIG. 13C shows navigation through linked contexts, where the linked contexts are a C/Gb context and an F/B context as represented on a computing device.

FIGS. 13A-C show a method for using a computing device 102 (shown in FIG. 13C), such as a computer, tablet, smartphone, electronic reader with the spatial harmonic system and method of the present disclosure. FIG. 13A shows the steps in a process for using a computing device 102 to identify the position of notes put into a computing device 102 within contexts 10. An interface between the computing device 102 and a user allows for navigation through contexts 10 by highlighting notes at the vertices 16 of contexts 10. Notes may be highlighted by geometric shapes or colors or any other means as would be known to one of ordinary skill in the art. Notes can be input into the computing device 102 through an audio input or other input means such as a keypad and similar devices as would be known to one of ordinary skill in the art.

FIGS. 13A and 13B show that a context may first be identified 130 (FIG. 13A), 230 (FIG. 13B) once initial data is input into the computing device 102 by the user. Once a context is identified, a diminished context 10 is displayed 132 (FIG. 13A), 232 (FIG. 13B) on a computing device 102. A note is input into the system 134 (FIG. 13A), 234 (FIG. 13B) and the computing device 102 locates the note 136 (FIG. 13A), 236 (FIG. 13B) within diminished context 10, whereupon the note is highlighted 138 (FIG. 13A), 238 (FIG. 13B) within the diminished context 10.

With regard to FIGS. 13B and 13C, when a note outside an identified key, or tonality, has been introduced 240, a set of linked contexts showing options for a key center change based on the note outside the identified key 242 may be displayed. In FIG. 13C, one option from a set of linked contexts is displayed based on the potential for the note introduced (Bb) to create a new context. Although all possible contexts may not be able to be shown on a screen at once, a cycling through possible contexts may be visualized. In FIG. 13, linked contexts 80*a* and 80*b* are shown sharing a note on rectangular face 90 of the first linked context 80*a* with the second linked context 80*b* where an F is the shared note and the new tonal center 22, and the Bb may signal a change from a first context to a second context.

In some embodiments, a shift to a new tonal center 22 constitutes a change in key. With regard to FIG. 13C, when a key change is identified, based on a series of notes played, at least one new (second) context 80*b* may be shown linked to a first context 80*a*, illustrating a relationship between a first tonal center 22 in a first context and a second tonal center 22 in a second context. For example, if initial input notes are based on a C scale from a first context (C/Gb) 80*a* and the tonal center being utilized is a C, when an input notes emphasize an F and Bb to create a new tonal center 22, or "home", a linked context 80*b* may be shown where the tonal center F is recognized and the linked context 80*b* is shown.

Figure 14:
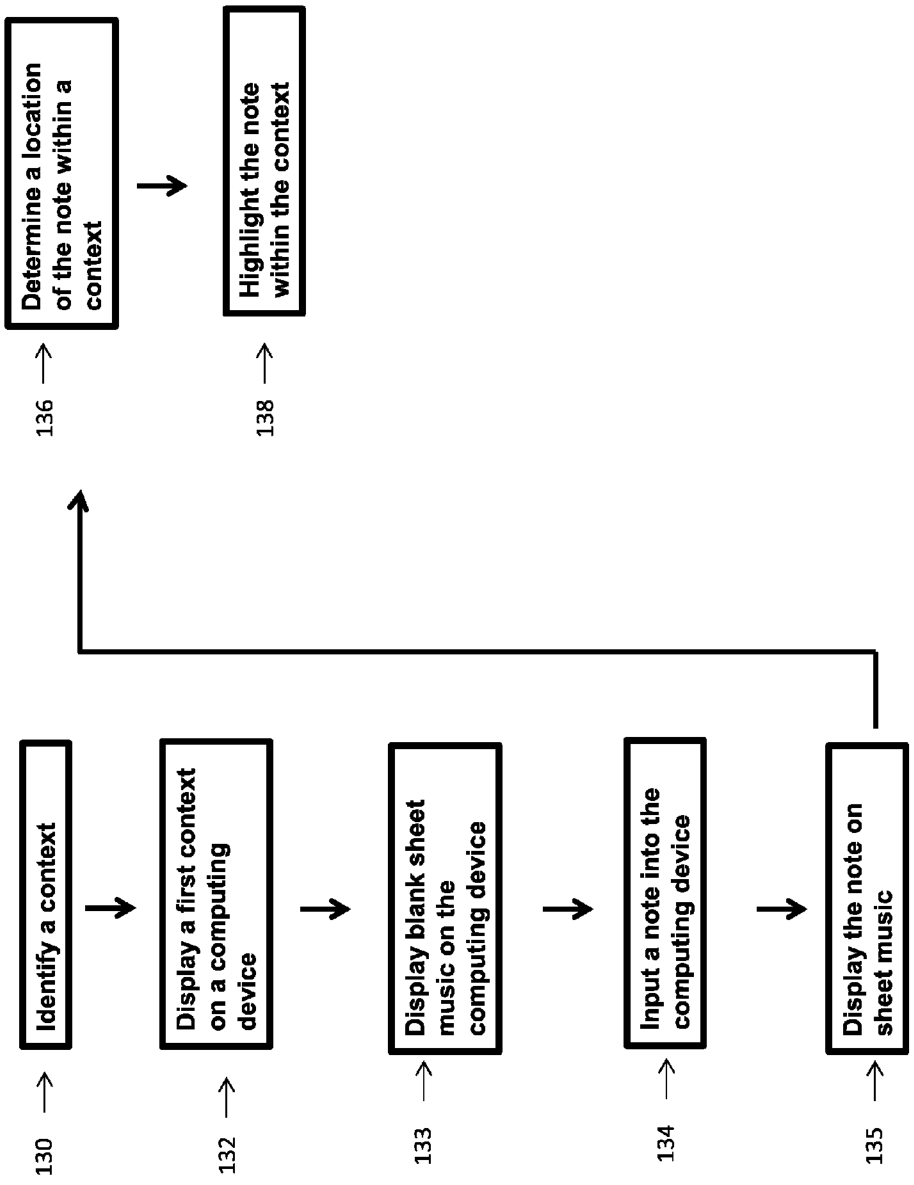
FIG. 14 is a flow diagram showing how sheet music may be transcribed into a context with a computing device.
Figure 15:
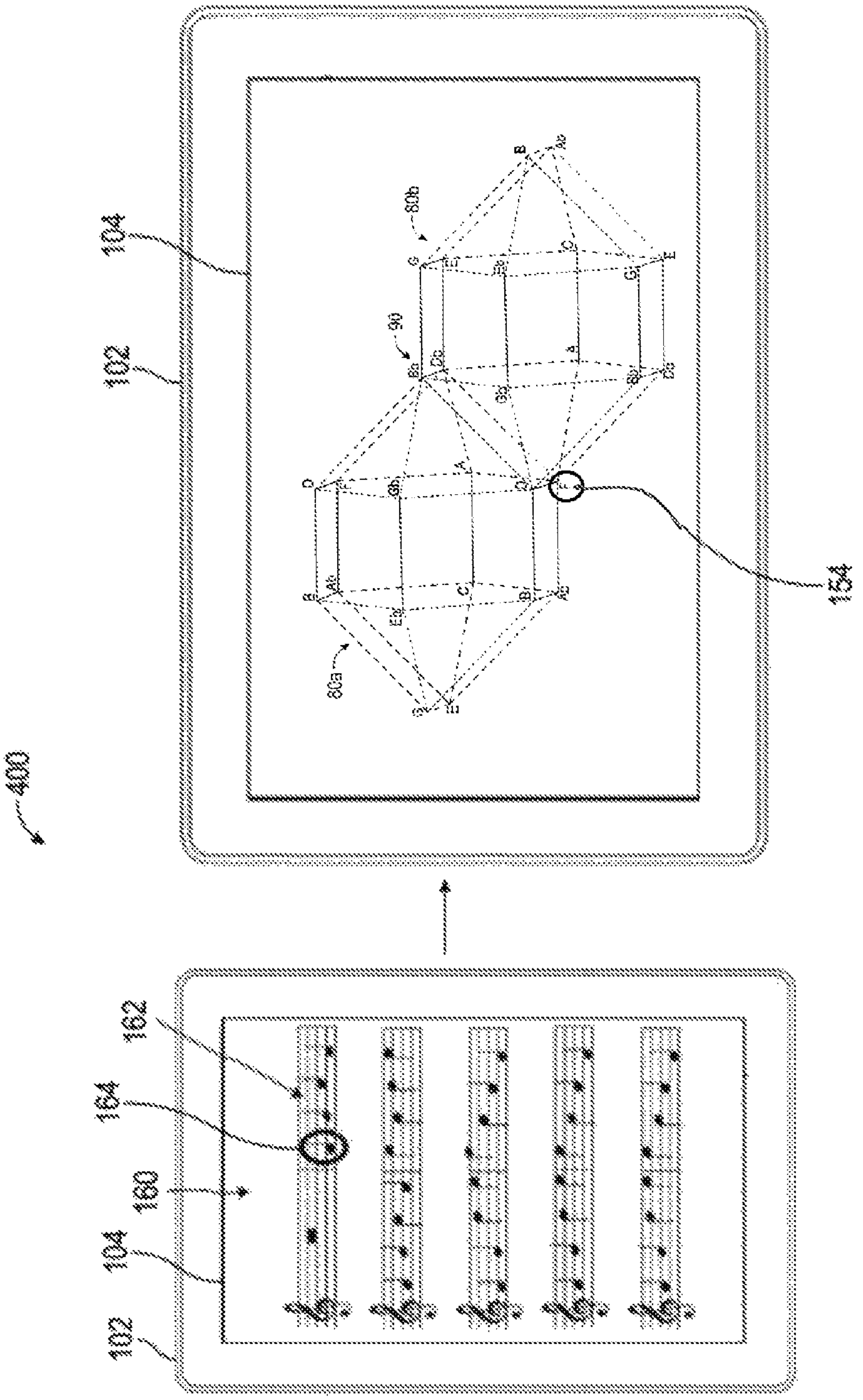
FIG. 15 shows how notes may be transcribed from sheet music to contexts on a computing device.

With regard to FIGS. 14 and 15, a process and apparatus, respectively, show how computing device 102 may display sheet music 160 side by side with related contexts 10 on a single display or on multiple monitors connected to a computing device 102. FIGS. 14 and 15 illustrate an overview of a sheet music related system 400 for implementing embodiments of the present disclosure. The present disclosure may interact with sheet music to illustrate harmonic movement through contexts 10. As described herein, "sheet music" may refer to sheet music data, which is an electronic representation of sheet music that the device may visually represent on a display. To generate the electronic sheet music, the computing device 102 may acquire sheet music, such as by accessing file(s)/document(s)/image(s) of sheet music.

The device 102 may identify musical symbols on a staff, determine notes from the musical symbols and associate the notes with the corresponding notes in a diminished context 10. The steps of the process of FIG. 14 include identifying a context 130, displaying a first context 132, displaying blank sheet music 133 and displaying an input note 135 on the sheet music 160. Progression through sheet music 160 is concurrently shown as a progression through contexts 10, which may be similar to an animated video when new contexts are shown. In FIGS. 14 and 15, when notes are input they may be highlighted in both sheet music 160 and in contexts 10 concurrently.

As a progression of notes in sheet music 160 moves from one key to another, or one diminished context 10 to another, and notes are shared between contexts 10, contexts may shift on display 104 to display linked contexts 80. Computing device 102 may in one embodiment have a function that includes playing audio from the sheet music or may modify sheet music based on a user input. User input, wherein a user is composing music, may also generate notes 162 in blank sheet music on display 104 of computing device 102 while concurrently highlighting, 164 and 154, the same notes on the sheet music and the shared note 154 in diminished context 10, respectively, as the music is composed.

Music information may be input from an instrument, or any form of equivalent such as a keypad or voice, whereupon such information, in the form of notes, will be highlighted within a diminished context 10 through which a user can navigate. The spatial harmonic system and method of the present disclosure may also input audio information from a musical piece and represent the movement of a melody or harmony from the musical piece, from one diminished context 10 to another, in addition to being manipulated to create chord progressions and melodies, thereby allowing a user to better understand the relationships between tonal center 20 changes within contexts 10.

Figure 16:
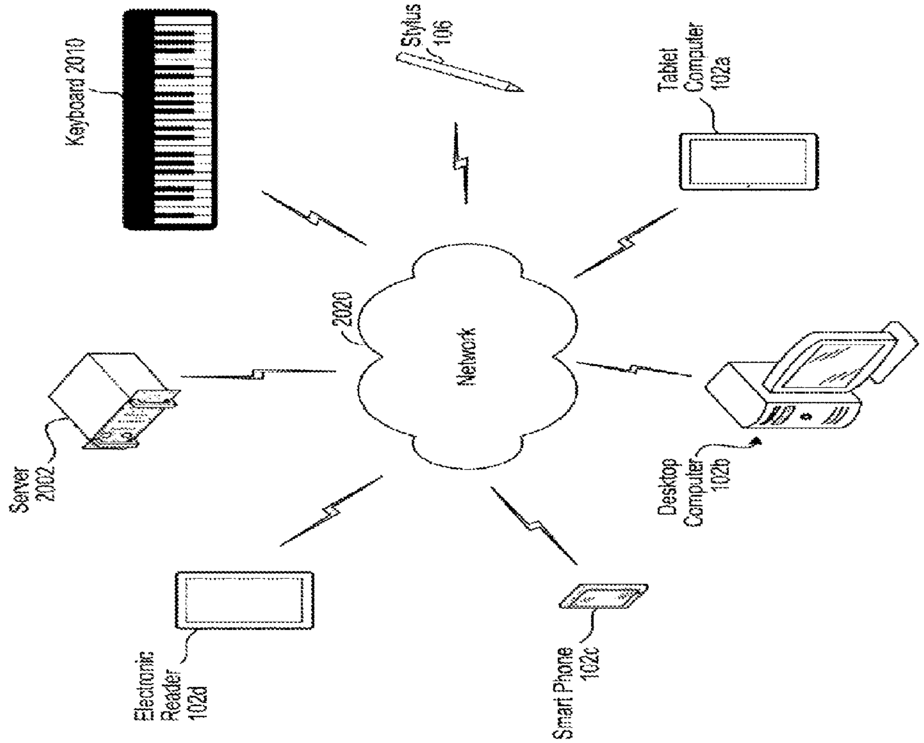
FIG. 16 is a block diagram conceptually illustrating an example of a computer network for use with the present system and method.

As shown in FIG. 16, multiple devices may be connected over a network 2020. The network 2020 may include a local or private network or may include a wide network such as the internet. Devices may be connected to the network 2020 through either wired or wireless connections. For example, a smart phone 102 *c* may be connected to the network 2020 through a wireless service provider. Other devices, such as tablet computer 102 *a*, desktop computer 102 *b*, electronic reader 102 *d*, server 2002 and/or keyboard 2010, may connect to the network 2020 through a wired connection. The server 2002 may be configured to receive, store, and manage data related to electronic sheet music and/or electronic musical symbol functionality executed in one or more of the tablet computer 102 *a*, desktop computer 102 *b*, smart phone 102 *c*, electronic reader 102 *d*, stylus 106, etc. For example, the server 2002 may display any of the structures or perform any of the steps described above with regard to FIGS. 1-16. Alternatively, the server 2002 may receive and store data generated by the tablet computer 102 *a*, desktop computer 102 *b*, smart phone 102 *c*, electronic reader 102 *d*, stylus 106, etc. using any of the steps described above. Thus, the sever 2002 may maintain data, images of sheet music and/or electronic sheet music to allow convenient access to any of the devices connected to the server 2002.

Figure 17:
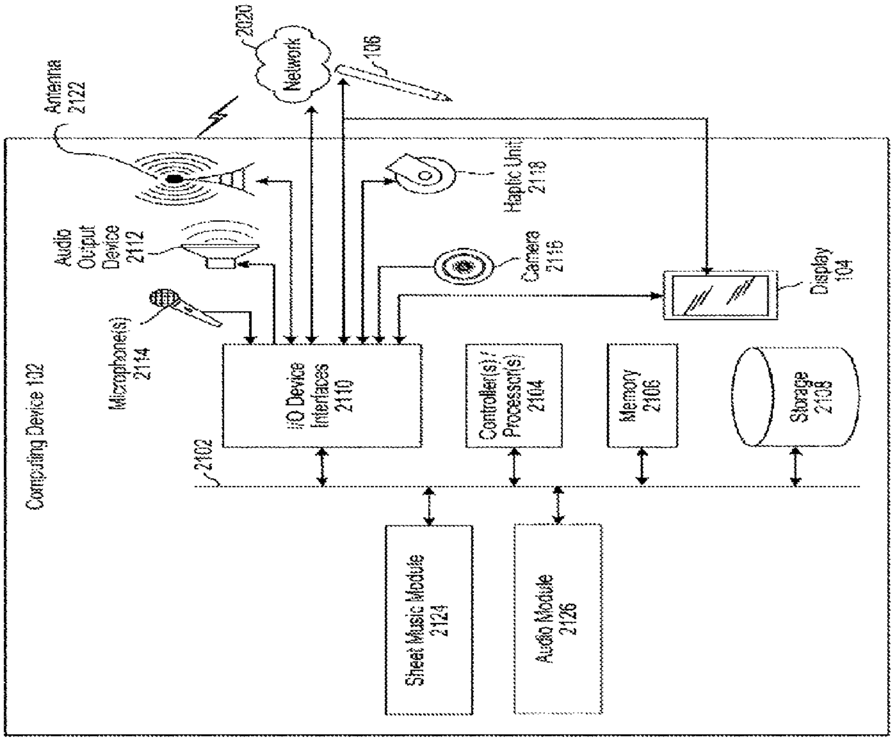
FIG. 17 is a block diagram conceptually illustrating example components of a computing device according to embodiments of the present disclosure.

As shown in FIG. 17, the computing device 102 may include an address/data bus 2102 for conveying data among components of the computing device 102. Each component within the computing device 102 may also be directly connected to other components in addition to (or instead of) being connected to other components across the bus 2102.

The computing device 102 may include one or more microcontrollers/controllers/processors 2104 that may each include a central processing unit (CPU) for processing data and computer-readable instructions, and a memory 2106 for storing data and instructions. The memory 2106 may include volatile random access memory (RAM), non-volatile read only memory (ROM), non-volatile magnetoresistive (MRAM) and/or other types of memory. The computing device 102 may also include a data storage component 2108, for storing data and microcontrollers/controller/processor-executable instructions. The data storage component 2108 may include one or more non-volatile storage types such as magnetic storage, optical storage, solid-state storage, etc. The computing device 102 may also be connected to removable or external non-volatile memory and/or storage (such as a removable memory card, memory key drive, networked storage, etc.) through input/output device interfaces 2110.

Computer instructions for operating the computing device 102 and its various components may be executed by the microcontroller(s)/controller(s)/processor(s) 2104, using the memory 2106 as temporary "working" storage at runtime. The computer instructions may be stored in a non-transitory manner in non-volatile memory 2106, storage 2108, or an external device. Alternatively, some or all of the executable instructions may be embedded in hardware or firmware in addition to or instead of software.

The computing device 102 includes input/output device interfaces 2110. A variety of components may be connected through the input/output device interfaces 2110, such as the display or display screen 104 having a touch surface or touchscreen; an audio output device for producing sound, such as speaker(s) 2112; one or more audio capture device(s), such as a microphone or an array of microphones 2114; one or more image and/or video capture devices, such as camera(s) 2116; one or more haptic units 2118; and other components. The display 104, speaker(s) 2112, microphone(s) 2114, camera(s) 2116, haptic unit(s) 2118, and other components may be integrated into the computing device 102 or may be separate.

The display 104 may be a video output device for displaying images. The display 104 may be a display of any suitable technology, such as a liquid crystal display, an organic light emitting diode display, electronic paper, an electrochromic display, a cathode ray tube display, a pico projector or other suitable component(s). The display 104 may also be implemented as a touchscreen and may include components such as electrodes and/or antennae for use in detecting stylus input events or detecting when a stylus is hovering above, but not touching, the display 104, as described above.

The input/output device interfaces 2110 may also include an interface for an external peripheral device connection such as universal serial bus (USB), FireWire, Thunderbolt, Ethernet port or other connection protocol that may connect to networks 2020. The input/output device interfaces 2110 may also include a connection to antenna 2122 to connect one or more networks 2020 via a wireless local area network (WLAN) (such as WiFi) radio, Bluetooth, and/or wireless network radio, such as a radio capable of communication with a wireless communication network such as a Long Term Evolution (LTE) network, WiMAX network, 3G network, etc. The stylus 106 may connect to the computing device 102 via one of these connections. The touchscreen of the display 104 and the stylus 106 may also communicate data or operating information to one another to enable the computing device 102 to determine a position of the stylus 106 relative to the touchscreen. The stylus 106 may also communicate to the device 102 (either through the display 104) or otherwise, information about the stylus such as a stylus identifier, user identifier, or other information. Additionally, in some embodiments, the computing device 102 (for example, the touchscreen) and the stylus 106 may communicate using electromagnetic communications (for example, electric fields generated by each device to transmit data on a carrier frequency), and/or haptic communications.

The computing device 102 further includes a sheet music module 2124 and an audio module 2126 that may perform the steps described above with regard to FIGS. 13-15. Some or all of the controllers/modules of the sheet music module 2124 and the audio module 2126 may be executable instructions that may be embedded in hardware or firmware in addition to, or instead of, software.

While preferred embodiments of this disclosure has been described above and shown in the accompanying drawings, it should be understood that applicant does not intend to be limited to the particular details described above and illustrated in the accompanying drawings, but intends to be limited only to the scope of the disclosure as defined by the following claims. In this regard, the term "configured" as used in the claims is intended to include not only the designs illustrated in the drawings of this application and the equivalent designs discussed in the text, but it is also intended to cover other equivalents now known to those skilled in the art, or those equivalents which may become known to those skilled in the art in the future.

Persons having ordinary skill in the field of computers and/or digital imaging should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein.

The concepts disclosed herein may be applied within a number of different devices and computer systems, including, for example, general-purpose computing systems, televisions, stereos, radios, server-client computing systems, mainframe computing systems, telephone computing systems, laptop computers, cellular phones, personal digital assistants (PDAs), tablet computers, wearable computing devices (watches, glasses, etc.), other mobile devices, etc. that can operate with a touchscreen.

Embodiments of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage medium may be implemented by a volatile computer memory, non-volatile computer memory, hard drive, solid-state memory, flash drive, removable disk and/or other media.

Embodiments of the present disclosure may be performed in different forms of software, firmware, and/or hardware. Further, the teachings of the disclosure may be performed by an application specific integrated circuit (ASIC), field programmable gate array (FPGA), or other component, for example.

As used in this disclosure, the term "a" or "one" may include one or more items unless specifically stated otherwise. Further, the phrase "based on" is intended to mean "based at least in part on" unless specifically stated otherwise.

What is claimed is:

1. A method of generating a visual representation of music, comprising:
- placing representations for notes selected from a set of twelve notes comprising an octave in a three dimensional structure;
- connecting each note in the three dimensional structure to other notes within the three dimensional structure with a line representing an interval, wherein each note is connected to at least three other notes, wherein each line comprises an edge of a face;
- forming a plurality of faces on the three dimensional structure with the lines;
- forming at least one face representing a diminished scale;
- forming at least one face representing an augmented scale, wherein each note in the at least one face representing a diminished scale belongs to only one note in at least one augmented scale connected to the diminished scale.

2. The method of claim 1, wherein each line represents either a major third interval or a minor third interval.

3. The method of claim 1, wherein each face is planar.

4. The method of claim 1, wherein each face is selected from the group consisting of a square, a rectangle and a triangle.

5. The method of claim 1, wherein at least one face is a square having vertices representing four notes in the diminished scale, thereby forming a diminished square.

6. The method of claim 1, wherein at least one face is a triangle having vertices representing three notes in the augmented scale, thereby forming an augmented triangle.

7. The method of claim 1, further comprising,
- identifying an occurrence of a first note;
- highlighting the first note within the three dimensional structure.

8. The method of claim 1, wherein each line has a length corresponding to a harmonic distance between notes.

9. The method of claim 1, further comprising navigating through the notes in the three dimensional structure.

10. The method of claim 1, further comprising combining in three dimensions four augmented triangles with two identical diminished squares, wherein each vertex of the two identical diminished squares shares a common note with a corresponding vertex of each augmented triangle, and all notes in the three dimensional structure are connected by lines between adjacent vertices to form a three dimensional structure with eighteen faces which is a diminished context.

11. The method of claim 1, further comprising combining in three dimensions eight augmented triangles and six diminished squares, wherein each vertex of the six diminished squares shares a common note with a corresponding vertex of each augmented triangle, and all notes in the three dimensional structure are connected by lines between adjacent vertices to form a three dimensional structure with twenty six faces to form a rhombicuboctahedron.

12. The method of claim 10, further comprising identifying a key center in the three dimensional structure; identifying a major scale in the three dimensional structure based on the key center; and highlighting notes within the identified major scale based on the key center.

13. The method of claim 10, further comprising identifying a first key center and a second key center within the three dimensional structure; identifying a first major scale based on the first key center; identifying a second major scale based on the second key center; wherein the first major scale and the second major scale formed by connecting consecutive third intervals within the three dimensional structure; and labeling the diminished context by the key centers.

14. The method of claim 10, further comprising linking a first three dimensional structure to a second three dimensional structure through a shared face and face edges wherein each three dimensional structure shares all notes at the vertices of the shared face and face edges; wherein the linked three dimensional structures comprise at least a first diminished context and a second diminished context.

15. The method of claim 13, wherein the first key center and the second key center share an identical diminished scale.

16. The method of claim 14, wherein the second diminished context is co-planar with the first diminished context.

17. A method for generating a visual representation of received musical input with a non-transient computer readable medium containing computer executable code, comprising:

placing note labels selected from twelve notes at vertices in a three dimensional structure, said note labels corresponding to twelve respective notes in an octave;

connecting each note in the three dimensional structure to other notes within the three dimensional structure with lines representing intervals, wherein each note is connected to at least three other notes;

forming a plurality of faces on the three dimensional structure, wherein each face has edges represented by lines, wherein at least one face represents a diminished scale and at least one face represents an augmented scale, wherein each note in a diminished scale belongs to only one note in a connected augmented scale connected to the diminished scale;

identifying an occurrence of at least one of the twelve notes based on received musical input;

highlighting at least one of the twelve notes based on received musical input.

18. The method of claim 17, further comprising highlighting at least one scale based on a key center in a context.

19. The method of claim 17, further comprising, removing highlighting following a predetermined time after a first note ceases to occur.

20. A method of generating a visual representation of music, comprising:

placing representations for notes selected from a set of twelve notes comprising an octave in a three dimensional structure;

connecting each note in the three dimensional structure to other notes within the three dimensional structure with a line representing an interval, wherein each note is connected to at least three other notes, wherein each line represents either a major third interval or a minor third interval;

forming a plurality of faces on the three dimensional structure, wherein each face has edges represented by lines, wherein at least one face represents a diminished scale and at least one face represents an augmented scale, wherein each note in a diminished scale belongs to only one note in a connected augmented scale connected to the diminished scale;

combining in three dimensions four augmented triangles and two identical diminished squares, wherein each vertex of the two identical diminished squares shares a common note with a vertex of each augmented triangle, and all notes in the three dimensional structure are connected by lines between adjacent vertices to form a three dimensional structure with eighteen faces defining a diminished context;

wherein each line has a length corresponding to a harmonic distance of the interval;

linking a first diminished context to a second diminished context through a shared face and face edges wherein, the shared face shares all notes at the vertices of the shared face and face edges.

* * * * *